United States Patent
Plummer et al.

(10) Patent No.: US 6,521,164 B1
(45) Date of Patent: Feb. 18, 2003

(54) INJECTION-MOLDABLE THERMOPLASTIC POLYURETHANE ELASTOMER

(75) Inventors: Thomas L. Plummer, Salt Lake City, UT (US); Val C. Comes, Taylorsville-Bennion, UT (US); George R. Wallace, Sandy, UT (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 08/772,714

(22) Filed: Dec. 23, 1996

Related U.S. Application Data

(60) Provisional application No. 60/011,240, filed on Feb. 6, 1996.

(51) Int. Cl.⁷ ............................ B29C 45/00; C08G 18/10
(52) U.S. Cl. ........................... 264/328.17; 264/331.19
(58) Field of Search ................... 264/328.17, 328.6, 264/331.19

(56) References Cited

U.S. PATENT DOCUMENTS

| | | |
|---|---|---|
| 3,214,411 A | 10/1965 | Saunders et al. |
| 3,233,025 A | 2/1966 | Frye et al. |
| 3,642,964 A | 2/1972 | Rausch, Jr. et al. |
| 3,899,467 A | 8/1975 | Bonk et al. |
| 3,929,732 A | 12/1975 | Shah |
| 3,963,679 A | 6/1976 | Ulrich et al. |
| 4,000,218 A | 12/1976 | Critchfield et al. |
| 4,051,111 A | 9/1977 | Holloway |
| 4,245,081 A | 1/1981 | Quiring et al. |
| 4,371,684 A | 2/1983 | Quiring et al. |
| 4,521,582 A | 6/1985 | Goyert et al. |
| 4,530,941 A * | 7/1985 | Turner et al. ............ 264/328.6 |
| 4,532,316 A | 7/1985 | Henn |
| 4,597,927 A | 7/1986 | Zeitler et al. |
| 4,762,884 A | 8/1988 | Goyert et al. |
| 4,931,479 A | 6/1990 | Morgan |
| 4,980,445 A | 12/1990 | van Der wal et al. |
| 5,013,811 A | 5/1991 | Ross |
| 5,066,762 A | 11/1991 | Ohbuchi et al. |
| 5,277,862 A * | 1/1994 | Steppan et al. .......... 264/328.6 |
| 5,391,682 A | 2/1995 | Ogawa et al. |
| 5,430,121 A | 7/1995 | Pudleiner et al. |
| 5,710,231 A * | 1/1998 | Fogg et al. ................ 264/300 |

FOREIGN PATENT DOCUMENTS

| | | |
|---|---|---|
| DE | 40 08 259 A1 | 9/1931 |
| EP | 0 152 049 A2 | 2/1985 |
| EP | 0 571 828 A2 | 5/1993 |
| EP | 0 598 283 A1 | 11/1993 |
| FR | 1.574.671 | 6/1969 |
| JP | 54-38399 | 3/1979 |
| JP | 59-197417 | 11/1984 |

OTHER PUBLICATIONS

Bundesrepublik Deutschland Offenlegungssclift 2 302 564 Jul. 25, 1974, see p. 6.*

(List continued on next page.)

*Primary Examiner*—Jill L. Heitbrink
(74) *Attorney, Agent, or Firm*—John A. Molnar, Jr.

(57) ABSTRACT

A thermoplastic polyurethane (TPU) elastomer and p-phenylene diisocyanate (PPDI)/polycaprolactone-based composition therefor having a unique chain extender combination for improved injection moldability. The elastomer is formed as the reaction product of: (A) from about 60 to 80% by weight of a hydroxyl-terminated poly(caprolactone) diol; (B) from about 17 to 22% by weight of a p-phenylene diisocyanate; (C) from about 3 to 10% by weight of a first hydroxyl-functional chain extender; and (D) less than about 2% by weight of a second hydroxyl-functional chain extender different from the first chain extender, the second chain extender being selected as effective to modify the crystallinity of the elastomer.

7 Claims, 2 Drawing Sheets

OTHER PUBLICATIONS

Attached are English abstracts for References Nos. AU thru AY and BA filed in the original Information Disclosure Statement of the within application on Dec. 23, 1996. (Note; there is no translation for Reference No. AZ).

Based TPUs from the Journal of Elasotmers and Plastics, vol. 17 (Oct. 1985).

Polyurethane Elastomers, Second Edition, received Nov. 8, 1995. pp. 246–281 only.

* cited by examiner

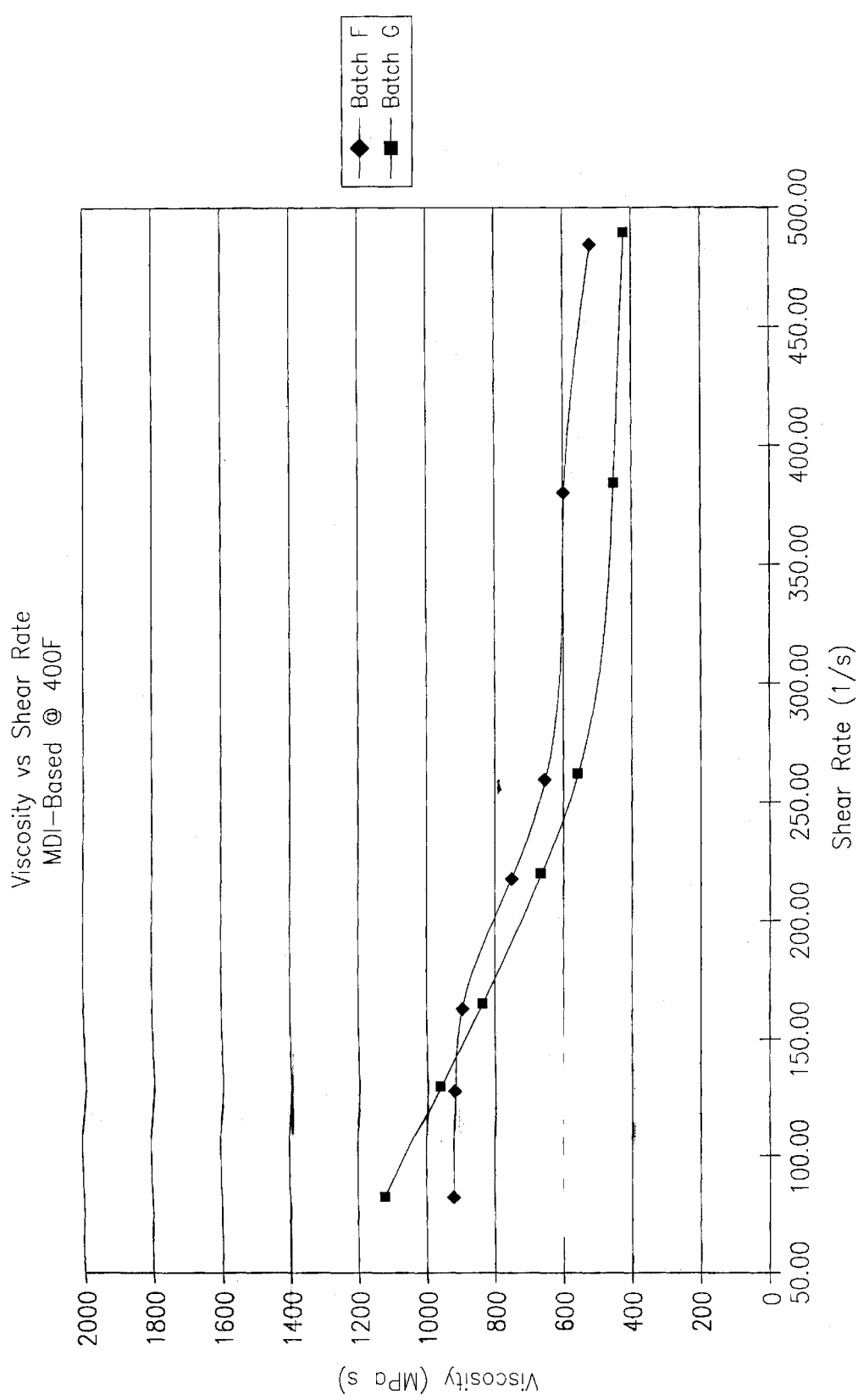

INJECTION-MOLDABLE THERMOPLASTIC POLYURETHANE ELASTOMER

This application claims the benefit of 60/011,240, filed Feb. 6, 1996.

BACKGROUND OF THE INVENTION

The present invention relates broadly to thermoplastic polyurethane elastomers, and more specifically to a p-phenylene diisocyanate (PPDI)-based composition therefor having a unique chain extender combination for improved injection moldability.

Polyurethane elastomers are often specified for applications wherein a material is specified as having exceptional resistance to abrasion, solvents, and oxygen aging, in addition to superior toughness, tear strength, elongation, shock absorption, hardness, flexibility, elasticity, and dynamic properties. Interest in these materials has continued to increase with the introduction of injection-moldable grades which may be economically processed for use in a wide variety of industrial and consumer products including: gears, bearings, and joints for precision machines; parts for electronic instruments; soles and uppers for atheletic shoes and ski boots; automotive parts; and seals, gaskets, and packings for hydraulic fluid systems and other applications.

Thermoplastic polyurethane materials, and particularly the injection-moldable TPUs of the type herein involved may be prepared by reacting diols or polymeric polyols, diisocyanate compounds, and polyfunctional chain extender compounds having, for example, hydroxyl or amino functional groups. Different combinations of these reactants have been processed by various methods to yield TPUs having a diverse range of properties. For example, U.S. Pat. Nos. 4,371,684 and 4,245,081 discloses a continuous process for the production of TPUs involving the steps of reacting in an extruder a linear polyol, a diisocyanate, and a chain extender which is a mixture of at least two different glycols. Preferred linear polyols include polyester, polycaprolactone, polyether, polythioether, polyesteramide, polycarbonate, and polyacetal polyols, with preferred diisocyanates including aliphatic, cycloaliphatic, aromatic, araliphatic and heterocyclic diisocyanates generally known in the art such as diphenyl methane diisocyanate, hexamethylene diisocyanate, isophorone diisocyanate, lysine ester diisocyanates, and tolylene, diphenyl methane, and xylene diisocyanates and hydrogenation products thereof. The preferred glycols include ethylene glycol, di- and tri-ethylene glycol, 1,2-propane diol, 1,3- and 1,4-butane diol, 1,6-hexane diol, 2-ethyl-1,3-hexane diol, 2,2-dimethyl propane diol, 1,4-bis-hydroxylmethyl cyclohexane, and hydroquinone dihydroxy ethyl ether. The chain extender mixture is stated to improve the processing of the composition in a twin- or other multi-screw extruder. The reference is silent, however, as to whether the chain extenders improve the injection molding properties of the resulting TPU.

U.S. Pat. No. 5,066,762 discloses a TPU resin having improved hydrolysis and heat deterioration resistance, temperature dependency, and compression set. The TPU is prepared by the reaction of p-phenylene diisocyanate, a hydroxyl terminated poly(hexamethylene carbonate) polyol, and a short chain polyol, such as ethylene glycol, 1,3-propylene glycol, 1,4-butanediol, neopentyl glycol, 3-methyl-1,5-pentanediol, p-xylene glycol, 1,4-bis-(β-hydroxyethoxy)benzene, 1,3-bis-(β-hydroxyethoxy) benzene, cyclohexane 1,4-dimethanol, octane-1,8-diol, and decane-1,10-diol, as a chain extending agent.

Castro, Hentschel, Brodowski, and Plummer, "Influence of Processing Conditions on Mechanical Properties of High Performance CHDI Based TPUs," J. Elast. and Plast., Vol. 17 (October 1985), pp. 238–248, discloses that mixed chain extenders may be employed to facilitate the injection molding of a trans-1,4-cyclohexane diisocyanate (CHDI)-based TPU. The chain extenders employed were bis(2-hydroxyethyl) bisphenol A, i.e., Dianol 22, and cyclohexane dimethanol (CHDM). A p-phenylene diisocyanate (PPDI)-based formulation additionally is referenced as illustrative of another high performance TPU.

Hepburn, "Polyurethane Elastomers," 2d ed., pp. 249–280, Elsevier Applied Science (London and New York, 1992), discloses the use of mixed chain extender systems in CHDI- and PPDI-based TPUs formulated with polycaprolactone (Capa 225) as the polyol. Bi-component combinations of 1,4-butane diol, 1,4cyclohexane dimethanol, 1,6-hexane diol, 1,1'-isopropylidene-bis-(p-phenylene-oxy)-di-β-ethanol (Dianol 22), 1,1'-isopropylidene-bis-(p-phenylene-oxy)-di-ω-propanol (Dianol 33) are employed for the chain extender system. Additionally disclosed is a PPDI-based TPU formulated with polytetramethylene glycol as the polyol which uses as a single-component chain extender such as hydroquinone dihydroxy ethyl ether.

U.S. Pat. No. 4,980,445 discloses a TPU exhibiting high resistance to abrasion forces while retaining a good impact resistance and creep behavior. The TPU is formed from the reaction product of a mixture of a polyester and a polyether diol, a difunctional chain extender, and a diisocyanate. The polyester diol may be a poly(oxycaproyl) diol or a poly(alkylene alkanedioate)diol, such as a poly(ethylene adipate), poly(propylene adipate), poly(butylene adipate), poly(ethylene/butylene adipate) diol, while the polyether diol may be a poly(alkylene oxide) glycol such as poly(ethylene oxide) diol, poly(propylene oxide) diol, poly(tetramethylene oxide) diol, or a block or random polyoxypropylene/polyoxyethylene or polyoxytetramethylene/polyoxyethylene copolymeric glycol. Preferred difunctional chain extenders include ethylene and propylene glycol, 1,4-butane diol, 1,3-butane diol, 1,5-pentanediol, 1,6-hexanediol, 1,10-decanediol, 1,12-dodecanediol, ethoxylated hydroquinone, 1,4-cyclohexane diol, N-methylethanolamine, N-methylisopropanolamine, 4-aminocyclo-hexanol, 1,2-diaminoethane, 2,4-toluenediamine, and the like. Preferred diisocyanates include aromatic, aliphatic, and cycloaliphatic diisocyanates such as m- and p-phenylene diisocyanates, 2,4- and 2,6-toluene diisocyanate, 4,4'-methylenebis(cyclohexyl isocyanate), and mixtures thereof The TPU may be prepared in a single-step process wherein the diols, diisocyanate, and chain extender are simultaneously mixed and reacted at an elevated temperature, or in a two-step process wherein the mixture comprising the diols is first reacted with the diisocyanate to form a diisocyanate-terminated prepolymer, which prepolymer is further reacted with the difunctional chain extender. Alternatively, the diisocyanate may first be reacted with the chain extender to form a product which is then reacted with the polyester and polyether diol mixture.

U.S. Pat. No. 5,013,811 discloses a linear TPU elastomer of a polyol, a first and second chain extender, and a diisocyanate component. The polyol may be a polyether polyol, polycarbonate polyol, polycaprolactone polyol, polyester polyol, polybutadiene polyol, or a mixture thereof The diisocyanate preferably is a diphenylmethane diisocyanate (MDI). The first and second chain extenders may be selected as different polyol or amine compounds having a molecular weight of less than about 500. Preferred first and second chain extends include 1,4-butane diol, tripropylene glycol, dipropylene glycol, propylene glycol, ethylene glycol, 1,6-hexane diol, 1,3-butane diol, neopentyl glycol, ethylene diamine, and mixtures thereof The TPU is formed at a relatively low processing temperature by initially reacting the diisocyanate with the first chain extender to form a modified diisocyanate, which diisocyanate is then reacted with the polyol and second chain extender.

U.S. Pat. No. 3,929,732 discloses a TPU elastomer formulation having enhanced exposure resistance to low temperatures. The TPU is derived from the reaction of 4,4'-methylenebis(phenyl isocyanate), a poly(1,4-butylene azelate), and a chain extender such as an aliphatic diol or bis(2-hydroxyethylether). The elastomer is described as particularly useful in fabrication parts for automobiles and the like which are exposed to severe temperature extremes.

U.S. Pat. No. 4,532,316 discloses polyurethane prepolymers which phase-separate into hard and soft segments. The prepolymers are provided as the reaction productions of a polyol, a diisocyanate, and a low molecular weight chain extender. Preferred diisocyanates include 4,4'-diphenylmethane diisocyanate, cyclohexanediisocyanate, p-phenylene diisocyanate, 1,5-cyclohexane, p-tetramethylxylene diisocyanate, m-tetramethylxylene, and admixtures thereof. Suitable chain extenders include glycols, aromatic diamines, alkanolamines, hydroxy acylamines, and aliphatic and cycloaliphatic diamines, and particularly 1,4-butane diol, 1,6-hexane glycol, hydroquinone di(hydroxyethyl)-bisphenol A, bis(2-hydroxypropyl)bisphenol A, bis(2-hydroxypropyl)isophthalate, bis (2-hydroxyethyl) carbamate, 1,2-bis(2-amino-phenylthio)ethane, trimethylene glycol, di-p-aminobenzoate, resorcinol di(hydroxyethyl) ether, 1,4-cyclohexane dimethanol, 4,4'-dihydroxy diphenyl sulfone, ethanolamine, ethylene diamine, butane diamine, and others. The polyol preferably is selected from poly (akylene ethers), polyesters, polycaprolactones, hydroxyl-terminated polyester amides, polycarbonates, and polybutadiene polyols.

U.S. Pat. No. 3,899,467 discloses polyurethane elastomers which are characterized by high thermostability and thermoplasticity. The elastomers are formed as the reaction product of 3,3'-dimethyldiphenyl4,4'-diisocyanate, a polyester diol such as polycaprolactone diol, and the bis(2-hydroxylethyl ether) of hydroquinone. The elastomers are described to be useful in gaskets, seals, O-rings, wire coating, and the like which require high service temperatures.

U.S. Pat. No. 4,051,111 discloses an injection moldable polyurethane which is described as having a good balance of physical properties including high stiffness and resistance to low temperature impact and elevated heat distortion. The polyurethane is formed as the reaction product of a hydroxyl-terminated polyester or polycaprolactone polyol, an aliphatic diol such as 1,4-butane diol, and a cyclic diisocyanate. Preferred diisocyanates include methylene-bis (4-cyclohexyl isocyanate), isophorone diisocyanate, diphenyl methane-4,4'-diisocyanate, p-phenylene diisocyanate, dichlorodiphenyl methane diisocyanate, dimethyl diphenyl methane diisocyanate, dibenzyl diisocyanate, diphenyl ether diisocyanate, and ditolylene diisocyanate.

U.S. Pat. No. 5,430,121 discloses a TPU which is modified with a segmented siloxane block copolymer. The TPU is formed as the reaction product of a dihydroxy compound such as an alkylene oxide, an isocyanate, a difunctional chain extender, and a linear, hydroxy-terminated polyol which preferably is a polyether or polycarbonate polyol. The chain extender may be an aliphatic diol or cycloaliphatic diamine such as ethylene glycol, butane diol, hexane diol, 1,4-di-(b-hydroxyethyl)-hydroquinone, isophorone diamine, or 4,4'-dicyclohexylmethane diamine.

U.S. Pat. No. 4,521,582 discloses a thermoplasticly-processable, branched TPU which is formed as the reaction product of naphthalene-1,5-diisocyanate, a chain lengthener mixture, and a hydroxyl-terminate prepolymer. The chain lengthener mixture may include diols, triols, and/or polyols such as trimethylol propane, 1,4-butane diol, 1,6-hexane diol, diethylene glycol, neopentyl glycol, ethane diol, and hydroquinone-di-(β-hydroxyethylether). The prepolymer preferably is formed as the reaction product of an isocyanate other than naphthalene-1,5-diisocyanate, such as an aromatic, cycloaliphatic, or aliphatic diisocyanate, and a polyhydroxyl compound such as hydroxyl polycarbonates, hydroxyl caprolactones, hydroxyl-polytetrahydrofurans, or hydroxyl polyethers based on polyethylene oxide and/or polypropylene oxide. The TPU is described as having good dimensional stability under heat, good rebound elasticity even at relatively low temperatures, acceptable low temperature flexibility, and outstanding wear resistance.

The TPUs and methods for processing the same representative of the state of the art have afforded manufacturers a capability to exploit the attractive physical properties of poly-urethanes using economical thermoplastic processing methods. For example, TPU elastomers, as having a desirable combination of such physical properties as good flexibility and resistance to low and elevated temperatures, have found use in the molding of automotive parts which are subject to service temperature extremes. Although a number of formulations have been proposed, PPDI-based systems are often preferred for critical applications as offering an especially attractive convergence of physical properties including low compression set and high resistance to elevated temperatures. Heretofore, however, the injection molding of PPDI-based TPUs generally has been limited to relatively small, annular parts and articles of dimensions less than about ¼-inch (6 mm) in cross-section and about 5 inches (12 cm) in diameter. Owing to the excellent physical properties of polyurethanes as compared to other thermoplastics, and particularly to the superior physical properties at elevated temperatures of PPDI-based polyurethanes as compared to other polyurethanes, the capability to fabricate larger part sizes from PPDI-based TPUs has been desired.

It therefore will be appreciated that continued improvements in PPDI-based TPUs would be well-received by the plastics molding industries. A preferred composition would facilitate the injection molding of larger parts and articles than heretofore were available in the art, while retaining the convergence of physical properties which makes PPDI-based formulations preferred for critical service environments such as in automotive, hydraulic, or other high temperature applications.

BROAD STATEMENT OF THE INVENTION

The present invention is directed to a p-phenylene diisocyanate (PPDI)/polycaprolactone-based thermoplastic polyurethane (TPU) composition having a unique chain extender combination for improved injection moldability. The extender combination includes a crystallinity modifier component which is selected as being effective to alter the crystallinity of the hard segment of the polymer. Such altering reduces the intermolecular hydrogen bonding between the hard segments of adjacent polymer chains, and thereby promotes relative movement between the chains for improved melt flow characteristics.

The improved melt flow of the composition of the present invention facilitates the fabrication of annular parts or other articles of a relatively large size up to about ½-inch (12.5 mm) or more in cross-section and up to about 50 inches (125 cm) in diameter without compromising the superior physical properties inherent in PPDI-based formulations. The inventive composition, moreover, exhibits a relatively high crystallization rate which allows for injection molding cycle times that are 25–50% shorter than for conventional MDI or tolidine diisocyanate (TODI)-based TPU formulations. The composition is moldable into an elastomer exhibiting excellent flex resistance, superior dynamic properties, and good cut and tear resistance even at elevated temperatures. The convergence of such properties makes the composition especially adapted for demanding or critical applications such as automotive parts or hydraulic seals, gaskets, packings, and the like.

It therefore is a feature of the present invention to provide a thermoplastic polyurethane (TPU) elastomer and a p-phenylene diisocyanate (PPDI)/polycaprolactone-based composition therefor having a unique chain extender combination for improved injection moldability. The elastomer is formed as the reaction product of: (A) from about 60 to 80% by weight of a hydroxyl-terminated poly(caprolactone) diol; (B) from about 17 to 22% by weight of a p-phenylene diisocyanate; (C) from about 3 to 10% by weight of a first hydroxyl-functional chain extender; and (D) less than about 2% by weight of a second hydroxyl-functional chain extender different from the first chain extender, the second chain extender being selected as effective to modify the crystallinity of the elastomer.

It is a further feature of the invention to provide a method of injection molding an article from a p-phenylene diisocyanate-based thermoplastic polyurethane elastomer. The method involves forming the elastomer as the reaction product of from about 60 to 80% by weight of a hydroxyl-terminated poly(caprolactone); from about 17 to 22% by weight of a p-phenylene diisocyanate; from about 3 to 10% by weight of a first hydroxyl-functional chain extender; and less than about 2% by weight of a second hydroxyl-functional chain extender different from the first chain extender, the second chain extender being selected as effective to modify the crystallinity of the elastomer. The elastomer so formed is heated to a temperature of from between about 440 to 480° F. (225 to 240° C.) to form a melt, at least a portion of which then is injected into a mold to form the article.

Advantages of the present invention include the provision of a PPDI-based TPU formulation which facilitates the injection molding of larger-sized parts and articles while retaining superior high temperature performance. Additional advantages include a composition which is moldable into an elastomer exhibiting excellent flex resistance, superior dynamic properties, and good cut and tear resistance at temperatures higher than for conventional TPUs. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying figures wherein:

FIG. 2 is a comparative plot of viscosity versus shear rate for the MDI-based TPU formulations of the prior art.

Figure 1:
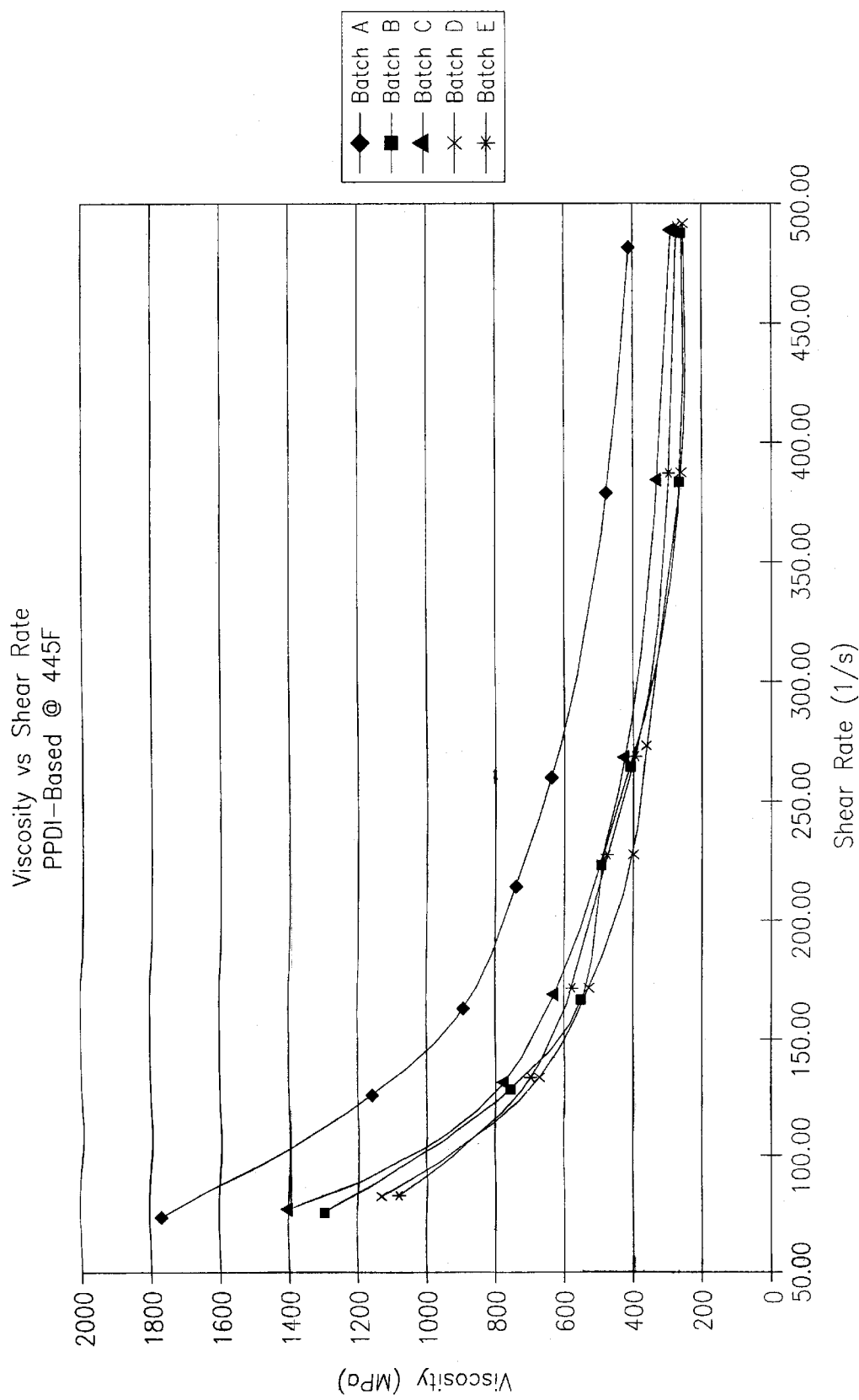
FIG. 1 is a plot of viscosity versus shear rate illustrating the improvement in the melt flow and injection molding properties of the modified PPDI-based TPU formulations of the present invention.

The figures will be described further in connection with the following Detailed Description of the Invention.

DETAILED DESCRIPTION OF THE INVENTION

The thermoplastic polyurethane (TPU) elastomer of the present invention is formed as the reaction product of: (A) from about 60 to 80% by weight of a hydroxyl-terminated polyol; (B) from about 17 to 22% by weight of a p-phenylene diisocyanate; (C) from about 3 to 10% by weight of a first hydroxyl-functional chain extender; and (D) less than about 2% by weight of a second hydroxyl-functional chain extender different from the first chain extender, the second chain extender being selected as effective to modify the crystallinity of the elastomer. The hydroxyl-terminated polyol preferably is a polyester polyol, and more preferably is a poly(caprolactone) diol. As is described in U.S. Pat. Nos. 3,899,467 and 4,051,111, polyols of such type may be prepared as the polyester reaction products of a caprolactone and a difunctional initiator such as an aliphatic glycol. Particularly preferred for the purposes of the present invention are polycaprolactone diols, such as CAPA 222, which are synthesized from the 1,4-butane diol-initiated polymerization of ε-caprolactone to have an average molecular weight of from about 2000 to 5000.

The organic diisocyanate to be reacted with the polyol is p-phenylene diisocyanate (PPDI). As is detailed in U.S. Pat. No. 5,066,762, PPDI is considered to be intractable as having an extremely high melting point of about 95° C. in addition to excessive sublimatablility. The isocyanate also is susceptible to dimer conversion while in a molten state. However, the superior physical properties at elevated temperatures of PPDI-based polyurethanes as compared to other polyurethanes makes PPDI the isocyanate which is preferred for the present application.

As to the first chain extender component, suitable compounds include aliphatic diols such as 1,4-butane diol, aliphatic, cycloaliphatic, and aromatic diamines, glycols such as ethylene glycol, and water. Functionally, such component is characterized as having a relatively low average molecular weight in the range of from about 40 to 500. The component additionally may be difunctional, symmetrical, linear, and/or crystalline. In this regard, an aliphatic diol such as 1,4-butane diol is especially preferred.

As is detailed in U.S. Pat. No. 3,929,732, it is well-known that the proportion of chain extender to polyester polyol controls the crystallinity or hardness of the resulting elastomer. Generally, the higher the proportion of extender, the more crystalline and harder the elastomer. For the purposes of the present invention, a ratio of polyol to chain extender of about 1:1.5 to 1:4 by mole equivalent is preferred.

In accordance with the precepts of the present invention, a second chain extender component is included at less than about 2% by total weight of the reaction mixture or mixtures. Again, functionally, such component is characterized as having a relatively low average molecular weight of from about 40 to 500. Additionally, however, the component is selected as being effective to modify, i.e., decrease, the crystallinity of the hard segments of the polymer chains which comprise the TPU elastomer of the present invention.

Compounds, which may be aliphatic, cycloaliphatic, or aromatic, that have been found suitable experimentally for use as the second chain extender component include hydroquinone dihydroxy ethyl ether (HQEE), neopentyl glycol (NPG), cyclohexane dimethanol (CHDM), and bis (2-hydroxyethyl) bisphenol A (Dianol 22). The specified compounds, moreover, have been observed to improved the melt flow viscosity and injection moldability of the elastomer without an appreciable adverse effect on the desirable physical properties thereof As is described in U.S. Pat. No. 4,532,316, it is known that TPU elastomers exhibit a morphology characterized by the formation of hard and soft segments in the polymer chains, which segments preferentially separate into distinct phases or domains. It is generally recognized that the soft segment is provided by the diol or polyol component, with the hard segment being provided by the reaction product of the organic diisocyanate and the chain extender. With respect to the PPDI-based TPU of the present invention, it is postulated that the second chain extender component is incorporated into at least a portion of the hard segments of the polymer chains effective to interfere with the hydrogen bonding normally exhibited between the hard segments of adjacent polymer chains. The relative mobility of the polymer chains is thereby increased with a corresponding improvement in melt flow viscosity and the injection moldability of the elastomer.

The effect of second chain extender on the physical properties of the elastomer has been observed to exhibit a "eutectic" profile. That is, at levels above a threshold amount of about 2% by weight, the addition of the second chain extender component is observed to degrade the performance properties of the TPU including its tensile strength, elongation, modulus, and compression set. At levels below the threshold amount, however, a synergistic convergence of physical and melt flow properties is realized which facilitates the injection molding of articles larger than heretofore known in the art without an appreciable effect on the desirable performance properties of the elastomer.

The first and second chain extender components may be provided in the formulation as an admixture or the like. It is preferred for the optimum convergence of injection molding and physical properties that the molar equivalent ratio of hydroxyl groups from the first chain extender to hydroxyl groups from the second chain extender is from about 20:1. That is, the second chain extender component is incorporated into the formulation at about 4–6% per molar equivalent of the first chain extender component.

It will be understood that the amount of PPDI to be employed in the practice of the present invention will depend upon the total amount of the hydroxyl-function components such as the diol, chain extender, and crystallinity modifier. Preferably, a molar excess of PPDI is used to ensure a complete reaction, with the molar equivalent ratio of NCO to OH groups being in the range of from about 1.0:1 to 1.15:1, i.e., 1.0 to 1.15 mol NCO groups per mol of OH groups. Although a small molar excess of either unreacted hydroxyl or isocyanate groups may be tolerated, the ultimate physical properties of the resulting elastomer could be deleteriously affected.

Additives such as pigments, fillers, lubricants, stabilizers, antioxidants, coloring agents, fire retardants, and the like are commonly used in TPU formulations, and optionally may be incorporated into the composition of the present invention. In addition, the components may be reacted in the presence of a catalyst to speed the reaction profile. Suitable catalysts which promote the reaction between the NCO groups of the diisocyanate and the hydroxyl groups of the diol and chain extenders include tertiary amines and organometallic compounds such as dibutyl tin dilaurate or stannous octoate. Such catalysts typically are provided in the formulation at about 0.005 to 0.1 parts by weight.

The injection-moldable, TPU elastomer of the present invention may be prepared in bulk via a "prepolymer" process. Such process involves reacting a mixture of the difunctional polyester polyol and the diisocyanate in a closed, temperature-controlled stirred tank reactor or, alternatively, a reactive extruder or the like to form a diisocyanate-terminated prepolymer or quasi-prepolymer. The prepolymer, which may be stored and/or shipped for off-site secondary processing, then may be subsequently reacted with the chain extenders and, optionally, an additional amount of polyol and additives for conversion into the TPU of the present invention. A preferred formulation for the TPU of the present invention is listed in Table 1.

TABLE 1

| Representative TPU Formulation (parts per 100 by weight) | |
| --- | --- |
| p-Phenylene Diisocyanate (Dupont, Hylene ® PPDI) | 19.5 |
| Polycaprolactone Diol (Union Carbide, Tone 1241; Interox Corp., CAPA 229) | 72.8 |
| 1,4-Butane Diol (DuPont) | 6.2 |
| Hydroquinone Dihydroxy Ethyl Ether (Rheine Chemie) | 1.5 |
| Irganox 1010 (anti-oxidant) | <1 |
| Acrawax C (internal lubricant) | <1 |
| Pigment (TiO$_2$ and Drakenfeld Pigments) C.I. Brown #24 Irgacolor Brown #10364 | <1 |
| Stannous Octoate (catalyst) | <1 |

Advantageously, the second reaction may proceed as a continuous, reactive process in an extruder which may be of a twin-screw, self-cleaning variety. The reaction components may be introduced into the feed zone of the extruder either separately or in a premixed form. The screws, which typically are counter-rotating, preferably are rotated at from about 125 to 350 rpm, with the barrel temperature maintained within the reaction zone at about 150 to 260° C. (300 to 500° F.). The average residence time of the reaction mixture within the barrel will varying depending upon screw speeds and IAD ratio of the screws, but preferably is from between about 0.25 to 4 minutes. The TPU elastomer product may be received from the outlet die of the extruder as a continuous strand which may be passed through a pelletizer for size reduction to facilitate bulk storage.

Reactive extrusion processes of the type herein involved are described further in U.S. Pat. Nos. 5,066,762; 4,980,445; 4,371,684; and 3,929,732; with reaction extrusion processing of a more general type being described in U.S. Pat. Nos. 5,391,682; 4,597,927; 4,245,081; 3,963,679; 3,642,964; and 3,233,025. Alternatively, the reaction of the prepolymer with the chain extenders may be effected batchwise via casting or reaction injection molding (RIM) techniques.

Prior to injection molding, the TPU should be dried at about 190° F. (88° C.) for about 12 hours to a moisture content of less than about 0.3% by weight. The processing of the TPUs of the present invention may be effected in a conventional reciprocating screw machine by following the temperature profile set forth in Table 2 which follows. Screw speeds of 25–40 ft/sec (7.5–12 m/s) and starting pressures in the range of about 5000–9000 psi (34 to 62 MPa) at melt temperature are preferred. The screw plasticizing pressure should start at about 800 psi (5.5 MPa). Conditions, of course, may vary depending on machine and mold design.

TABLE 2

Typical Process Conditions for Injection Molding

| Optimum Melt Temperature | Melt (Stock) Temperature Range | Typical Cylinder Temperature | | | |
|---|---|---|---|---|---|
| | | Nozzle | Front | Center | Rear |
| 232° C. | 226–240° C. | 229° C. | 224° C. | 221° C. | 218° C. |
| 450° F. | 440–460° F. | 445° C. | 435° C. | 430° C. | 425° C. |

The optimum mold temperature will vary according to part size and mold configuration, but should start at about 90° F. (32° C.). The highest practical temperature is preferred in order to minimize residual stresses in the molded part. The improved melt flow of the composition of the present invention, however, allows shot weights of up to about 110–150 oz (3–4 kg) for the fabrication of annular parts and other articles which are up to about ½-inch (12.5 mm) or more in cross-section and up to about 50 inches (125 cm) in diameter without compromising the superior physical properties inherent in the PPDI-based formulation.

Mold design considerations are the same as for conventional TPUs. For example, a sprue having a taper of from between about 2–6° should be provided, as should a fill round, undercut sprue puller. Runners typically should be from between about 0.1875–0.25 inch (4.7–6.4 mm), and gates should be as large as possible, e.g., about 0.06 inch (1.6 mm) in minimum diameter, to prevent excessive friction, short shots, and the need for excessive screw pressures.

The PPDI-based TPU elastomers of the present invention are especially adapted for high-temperature automotive parts, hydraulic seals, packings, and gaskets, and for other critical applications in demanding or severe environments. In this regard, the elastomers exhibit a unique convergence of improved injection moldability and superior high temperature performance. Representative physical properties of a TPU elastomer formulated in accordance with the present invention are presented in Table 3.

TABLE 3

Representative Physical Properties of the Inventive PPDI-Based TPU Elastomers

| | |
|---|---|
| Molecular Weight | 55,000 (number average) |
| Hardness | 94 Shore A |
| Modulus at 100% Elongation | 1900 psi (13.1 MPa) |
| Ultimate Tensile Strength | 8500 psi (58.6 MPa) |
| Ultimate Elongation | 600% |
| Specific Gravity | 1.19 |
| Rebound Resilience | 64% |
| Service Temperature Range | −29 to 135° C. (−20 to 275° F.) |
| Compression Set (ASTM D395B) | |
| 70 hr @ 70° C. (158° F.) | 16.7% |
| 70 hr @ 100° C. (212° F.) | 31.0% |
| 70 hr @ 120° C. (248° F.) | 35.0% |
| Tear Strength-Die C (ASTM D624-54) | 860 pli (155 kN/m) |
| Taber Abrasion (1000 g wheel, CS-10F) | 28 mg last/1000 cycles |

The Examples which follow are illustrative of the precepts of the present invention, but should not be construed in any limiting sense.

EXAMPLES

Example 1

To demonstrate the improved melt flow and injection moldability properties of the PPDI-based TPU of the present invention, master batches (B–E) were prepared using a poly(caprolactone) diol (CAPA) and select secondary chain extenders, i.e., crystallinity modifiers, added to the formulation at 10% per equivalent weight of 1,4-butane diol (BDO) as the primary chain extender. The formulations of those batches, a control batch (A) having no secondary chain extender, and diphenylmethane diisocyanate (MDI)-based comparative batches (F–G), are summarized in Table 4.

TABLE 4

Comparative TPU Formulations

| Batch | Isocyanate | Polyol | 1° Chain Extender | 2° Chain Extender |
|---|---|---|---|---|
| A (Control) | PPDI | (CAPA) | BDO | None |
| B | PPDI | (CAPA) | BDO | HQEE |
| C | PPDI | (CAPA) | BDO | Dianol-22 |
| D | PPDI | (CAPA) | BDO | NPG |
| E | PPDI | (CAPA) | BDO | CHDM |
| F (Control) | MDI | (CAPA) | BDO | None |
| G | MDI | (CAPA) | BDO | HQEE |

The viscosities of each of the PPDI-based master batches (A–E) were measured at 445° F. (230° C.) as a function of shear rate, and were compared against the response of the control batch formulated with no secondary chain extender. The results, which are graphically depicted in FIG. 1 as plots of viscosity versus shear rate, confirm that melts of the PPDI-based formulations which include a secondary chain extender/crystallinity modifier in accordance with the percepts of the present invention exhibit lower viscosities than the control formulation having no crystallinity modifier. The lower melt viscosities of the formulations of the present invention translate directly into improved injection molding of larger-sized parts and articles.

Additionally, the viscosities at 400° F. (200° C.) of the MDI-based master batches (F–G) were compared as a function of shear rate. These results, which are plotted in FIG. 2, show only a minimal improvement in the flow properties of the HQEE-modified formulation (G) as compared to the control formulation (F). Thus, the results observed with respect to the PPDI-based formulations of the present invention are considered to be unexpected vis-a-vis what would be anticipated in view of the results for MDI-based formulations.

Example 2

To confirm that the formulations of the present invention retain the preferred performance properties of PPDI-based compositions, the ultimate tensile strength, elongation, 100% and 300% modulus, and compression set of the master batches B–E of Example 1 were measured and compared against the PPDI-based control batch A formulated with no secondary chain extender, and against the MDI-based batches F–G. The results, which are summarized in Table 5 as average values, show that the inventive formulations B–E have performance properties which are comparable to the PPDI-based control formulation A, and which are improved over those of the MDI-based formulations F–G. That is, the improvement in injection moldability is achieved with no degradation in the performance of the elastomer.

TABLE 5

Comparative Physical Properties of the TPU Formulations

|  | Batch | | | | | | |
| --- | --- | --- | --- | --- | --- | --- | --- |
|  | A | B | C | D | E | F | G |
| Tensile Strength (psi) | 8141 | 8056 | 8067 | 8189 | 8135 | 8067 | 8077 |
| Elongation (%) | 673 | 647 | 617 | 667 | 625 | 488 | 462 |
| 100% Modulus (psi) | 2258 | 1967 | 1929 | 1925 | 1977 | 1702 | 1581 |
| 300% Modulus (psi) | 3178 | 2874 | 2903 | 2830 | 2965 | 4283 | 4650 |
| Rebound (%) | 65 | 64 | 64 | 65 | 66 | 36 | 30 |
| Hardness (Shore A) | 95 | 94 | 95 | 94 | 94 | 95 | 94 |
| Compression Set (%)[1] | | | | | | | |
| 70 hr @ 100° C. | 30.7 | 34.6 | 32.2 | 30.3 | 29.1 | | |
| 70 hr @ 70° C. | | | | | | 24.3 | 21.1 |

[1](ASTM 395B)

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed:

1. A method of injection molding an article from a p-phenylene diisocyanate-based thermoplastic polyurethane elastomer comprising the steps of:

(a) forming said elastomer as the reaction product of a formulation consisting essentially of: from about 60 to 80% by weight of a hydroxyl-terminated poly (caprolactone) diol; from about 17 to 22% by weight of a p-phenylene diisocyanate; from about 3 to 10% by weight of a first hydroxyl-functional chain extender selected from the group consisting of glycols, amines, diols, and water; and less than about 2% by weight of a second hydroxyl-functional chain extender different from said first chain extender, and selected from the group consisting of hydroquinone dihydroxy ethyl neopentyl glycol, cyclohexane dimethanol, bis(2-hydroxyethyl) bisphenol, and mixtures thereof as effective to modify the crystallinity of said elastomer;

(b) heating said elastomer to a temperature of from between about 440 to 480° F. to form a melt; and (c) injecting at least a portion of said melt into a mold to form said article.

2. The method of claim 1 wherein said melt is injected in step (c) at a pressure of from between about 5000–9000 psi.

3. The method of claim 1 wherein said article is formed in step (c) as having a cross-sectional thickness greater than about 0.25 inch, and a diametric extent of greater than about 5 inches.

4. The method of claim 1 wherein said article is formed in step (c) as weighing up to about 150 ounces.

5. The method of claim 1 wherein said first chain extender is 1,4-butane diol.

6. The method of claim 1 wherein said elastomer is formed in step (a) as the reaction product of from about 0.1 to 1.6% by weight of said second chain extender.

7. The method of claim 1 wherein said elastomer of step (a) has a modulus at 100% elongation of about 1900 psi, a tensile strength of about 8500 psi, a compression set of about 30% at 212° F. and an elongation of about 600%.

* * * * *